United States Patent
Ueno (10) Patent No.: US 10,423,272 B2
(45) Date of Patent: Sep. 24, 2019

(54) ELECTRONIC APPARATUS, CONTROL METHOD THEREOF, AND COMPUTER-READABLE STORAGE MEDIUM

(71) Applicant: CANON KABUSHIKI KAISHA, Tokyo (JP)

(72) Inventor: Daiyu Ueno, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 39 days.

(21) Appl. No.: 15/596,225

(22) Filed: May 16, 2017

(65) Prior Publication Data
US 2017/0351373 A1    Dec. 7, 2017

(30) Foreign Application Priority Data
Jun. 1, 2016  (JP) ................ 2016-110218

(51) Int. Cl.
  *G06F 3/041*   (2006.01)
  *G06F 3/0484*  (2013.01)
  *H04N 5/232*   (2006.01)
  *G06F 3/0488*  (2013.01)
  (Continued)

(52) U.S. Cl.
  CPC ........ *G06F 3/0416* (2013.01); *G06F 3/04842* (2013.01); *G06F 3/04845* (2013.01); *G06F 3/04886* (2013.01); *G06F 9/453* (2018.02); *H04N 5/23216* (2013.01); *H04N 5/23241* (2013.01); *H04N 5/23293* (2013.01); *H04N 5/232939* (2018.08); *G06F 3/0488* (2013.01); *G06F 3/04817* (2013.01); *H04N 5/23245* (2013.01)

(58) Field of Classification Search
  CPC .............. G06F 3/0416; G06F 3/04845; G06F 3/04817; G06F 3/0488; G06F 3/04842; G06F 3/04886; G06F 3/04883; G06F 3/0418; G06F 9/453; G06F 21/36; H04N 5/23293; H04N 5/23216; H04N 5/23241; H04N 5/23245
  USPC ..................................................... 348/333.02
  See application file for complete search history.

(56) References Cited

U.S. PATENT DOCUMENTS

| 9,641,666 | B2 * | 5/2017 | Higashibeppu | ......... H04M 1/67 |
| 9,811,246 | B2 * | 11/2017 | Park | ..................... G06F 3/0484 |
| 9,954,989 | B2 * | 4/2018 | Zhou | ..................... H04M 1/67 |

(Continued)

FOREIGN PATENT DOCUMENTS

| JP | 2013-200841 A | 10/2013 |
| JP | 2014-232341 A | 12/2014 |

*Primary Examiner* — Pritham D Prabhakher
(74) *Attorney, Agent, or Firm* — Venable LLP (57) ABSTRACT

An electronic apparatus comprises: a detection unit configured to detect a touch operation on a display unit; a control unit configured to control the electronic apparatus, in a touch operation restriction state in which a touch operation on a position different from a specific area on the display unit is invalidated, to release the restriction state and make a transition to a state in which a touch operation on a position different from the specific area is accepted upon detecting a predetermined touch operation on the specific area; and a display control unit configured to control the display unit to perform display to indicate the specific area upon detecting a touch operation on a position different from the specific area on the display unit in the restriction state.

20 Claims, 6 Drawing Sheets

(51) Int. Cl.
*G06F 9/451* (2018.01)
*G06F 3/0481* (2013.01)

(56) References Cited

U.S. PATENT DOCUMENTS

| | | | |
|---|---|---|---|
| 10,216,312 B2* | 2/2019 | Park | G06F 3/0416 |
| 10,222,974 B2* | 3/2019 | Lamb | G06F 3/04883 |
| 2013/0249836 A1 | 9/2013 | Nakata et al. | |
| 2015/0199098 A1* | 7/2015 | Park | G06F 3/0484 |
| | | | 715/790 |
| 2015/0363086 A1* | 12/2015 | Uno | G06F 3/0488 |
| | | | 715/765 |
| 2016/0077731 A1 | 3/2016 | Fukui | |
| 2016/0112554 A1* | 4/2016 | Shintani | H04M 1/271 |
| | | | 455/563 |
| 2016/0180845 A1* | 6/2016 | Kim | G06F 3/167 |
| | | | 348/211.2 |
| 2017/0060315 A1* | 3/2017 | Park | G06F 3/0482 |
| 2017/0090714 A1* | 3/2017 | Lee | G06F 3/0488 |
| 2017/0094156 A1* | 3/2017 | Kim | G06F 3/013 |
| 2018/0048752 A1* | 2/2018 | Zhou | H04M 1/67 |

* cited by examiner

ELECTRONIC APPARATUS, CONTROL METHOD THEREOF, AND COMPUTER-READABLE STORAGE MEDIUM

BACKGROUND OF THE INVENTION

Field of the Invention

The present invention relates to an electronic apparatus, a control method thereof, and a computer-readable storage medium.

Description of the Related Art

For a conventional touch panel designed to accept user's touch operations, there is known a technique of restricting touches on areas other than touch valid areas configured to validate touch operations to prevent erroneous operations caused by user's touches on positions different from the user's intentions (Japanese Patent Laid-Open No. 2013-200841).

In addition, Japanese Patent Laid-Open No. 2014-232341 discloses a technique of displaying, when the user touches a touch restriction area configured to restrict touch operations, information indicating that the area that the user has touched is configured to restrict touch operations. The technique disclosed in Japanese Patent Laid-Open No. 2014-232341 allows the user to easily recognize that a touched area is a touch restriction area.

The technique disclosed in Japanese Patent Laid-Open No. 2013-200841 enables the user to understand that touch operations are restricted because of restrictions on touches on areas other than touch valid areas. However, the user dose not notice the presence of touch valid areas. In addition, the technique disclosed in Japanese Patent Laid-Open No. 2014-232341 enables the user to understand, when he/she touches a touch restriction area, that he/she has touched an area configured to restrict touch operations. However, the user does not notice the presence of touch valid areas as in the above case.

SUMMARY OF THE INVENTION

The present invention has been made in consideration of the aforementioned problems, and realizes a technique of enabling the user to notice the presence of specific areas configured to accept touch operations on a screen configured to restrict touch operations, when he/she touches a position other than the specific areas configured to accept touch operations.

In order to solve the aforementioned problems, one aspect of the present invention provides an electronic apparatus comprising: a detection unit configured to detect a touch operation on a display unit; a control unit configured to control the electronic apparatus, in a touch operation restriction state in which a touch operation on a position different from a specific area on the display unit is invalidated, to release the restriction state and make a transition to a state in which a touch operation on a position different from the specific area is accepted upon detecting a predetermined touch operation on the specific area; and a display control unit configured to control the display unit to perform display to indicate the specific area upon detecting a touch operation on a position different from the specific area on the display unit in the restriction state.

Another aspect of the present invention provides, a control method of an electronic apparatus having: detecting a touch operation on a display unit; controlling the electronic apparatus, in a touch operation restriction state in which a touch operation on a position different from a specific area on the display unit is invalidated, to release the restriction state and make a transition to a state in which a touch operation on a position different from the specific area is accepted upon detecting a predetermined touch operation on the specific area; and controlling the display unit to perform display to indicate the specific area upon detecting a touch operation on a position different from the specific area on the display unit in the restriction state.

Still another aspect of the present invention provides, a non-transitory computer-readable storage medium storing a program for causing a computer to execute a control method of an electronic apparatus having: detecting a touch operation on a display unit; controlling the electronic apparatus, in a touch operation restriction state in which a touch operation on a position different from a specific area on the display unit is invalidated, to release the restriction state and make a transition to a state in which a touch operation on a position different from the specific area is accepted upon detecting a predetermined touch operation on the specific area; and controlling the display unit to perform display to indicate the specific area upon detecting a touch operation on a position different from the specific area on the display unit in the restriction state.

According to the present invention, it is possible to enable the user to notice the presence of specific areas configured to accept touch operations on a screen configured to restrict touch operations, when he/she touches a position other than the specific areas configured to accept touch operations.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Preferred embodiments of the present invention will be described below with reference to the accompanying drawings.

(Arrangement of Digital Camera)

Figure 1A:
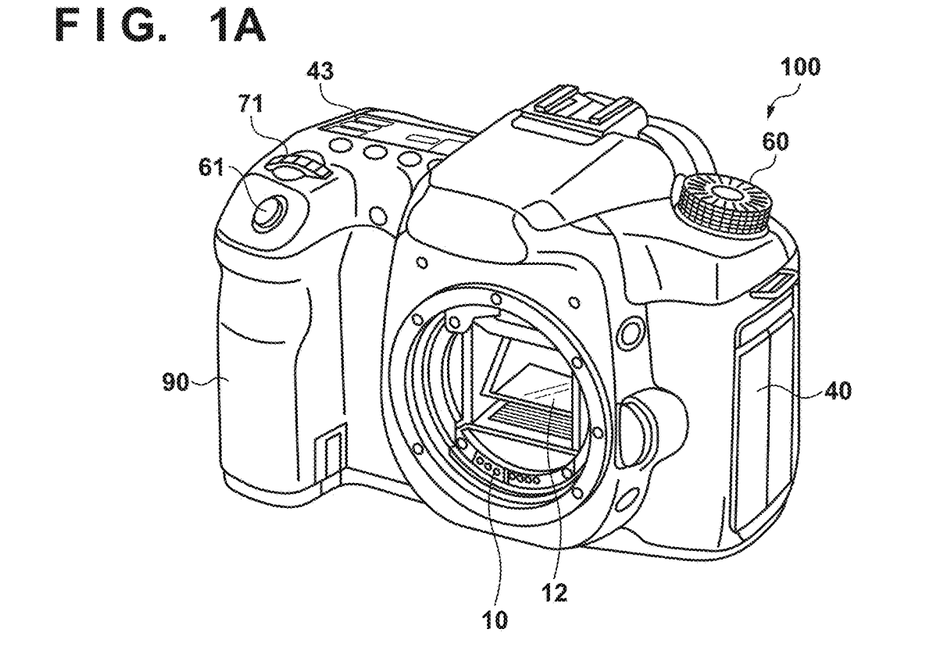
FIGS. 1A and 1B are perspective views showing an example of the appearance configuration of a digital camera according to an embodiment.
Figure 1B:
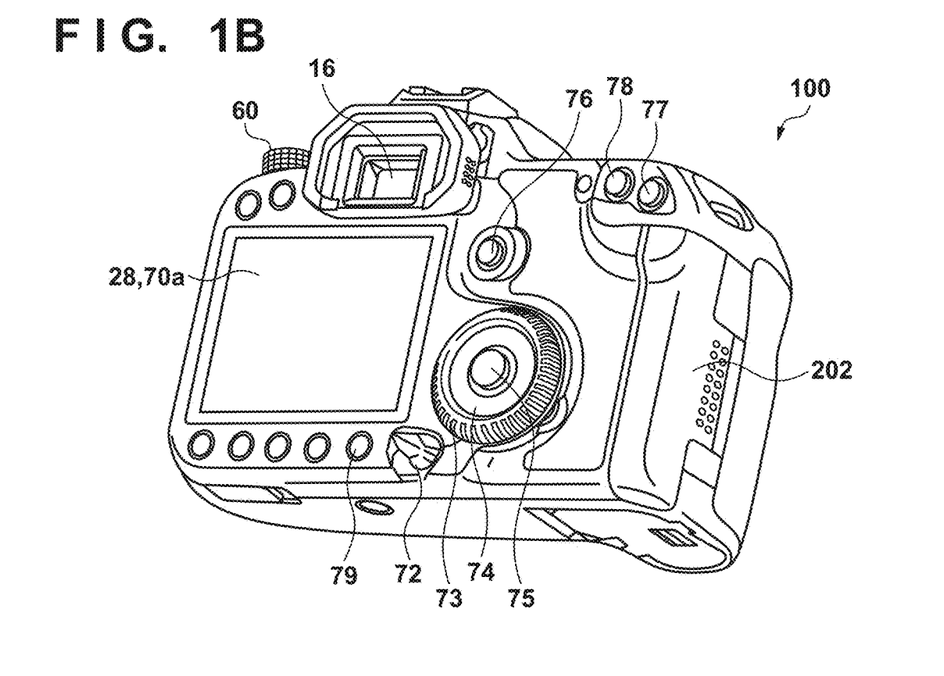

FIGS. 1A and 1B show the outer appearance of a digital camera as an example of an electronic apparatus according to the present invention. FIG. 1A is a front perspective view of a digital camera 100. FIG. 1B is a back perspective view of the digital camera 100. Referring to FIGS. 1A and 1B, a display unit 28 is provided on the back face of the camera. The display unit 28 includes a display panel formed from, for example, an LCD or organic EL and displays images and various kinds of information. A viewfinder external display unit 43 is a display unit provided on the top face of the camera, and displays various set values for the camera, such as shutter speeds and f-numbers. A shutter button 61 is an operation unit with which the user issues a shooting instruction. A mode switch 60 is an operation unit for switching between various types of modes. A terminal cover 40 is a cover for protecting connectors (not shown) such as connection cables for connecting external apparatuses to the digital camera 100. A main electronic dial 71 is a rotating operation member included in an operation unit 70. For example, the user can change a set value such as a shutter speed or f-number by rotating the main electronic dial 71. A power switch 72 is an operation member for switching on and off the power supply of the digital camera 100. A sub-electronic dial 73 is a rotating operation member included in the operation unit 70. The user can perform operations such as moving a selection frame and image feeding with the sub-electronic dial 73. A cross-key 74 (four-direction key) is included in the operation unit 70. The user can press down the upper, lower, right, and left portions of the cross-key 74. Pressing the cross-key 74 can perform an operation corresponding to the pressed portion of the cross-key 74 with respect to the cursor. A SET button 75 is a press button included in the operation unit 70, and is mainly used to decide a selection item. An LV button 76 is an operation button included in the operation unit 70 and used to switch on and off the live view (to be referred to as LV hereinafter) on a menu button. In a moving image capturing mode, this button is used to issue an instruction to start or stop moving image capturing (recording). An enlargement button 77 is an operation button included in the operation unit 70 and used to turn on and off an enlargement mode in live view display in the shooting mode and change a magnification factor in a magnification mode. In a playback mode, this button functions as a magnification button for magnifying a playback image and increasing the magnification actor. A reduction button 78 is an operation button included in the operation unit 70 and used to reduce the magnification factor of a magnified playback image and reduce a displayed image. A playback button 79 is an operation button included in the operation unit 70 and used to switch between the shooting mode and the playback mode. Pressing down the playback button 79 during the shooting mode will shift to the playback mode to cause the display unit 28 to display the newest one of the images recorded on a storage medium 200. A quick return mirror 12 is moved up and down by an actuator (not shown) in accordance with an instruction from a system control unit 50. A communication terminal 10 allows the digital camera 100 to communicate with the lens size (detachable). An eyepiece viewfinder 16 is a look-in viewfinder used to check the focus and composition of an optical image of an object obtained through a lens unit 150 by observing a focusing screen 13. A lid 202 is the lid of a slot accommodating a storage medium 200. A grip portion 90 is a holding unit having a shape that allows the user to easily grip with his/her right hand when holding the digital camera 100.

Figure 2:
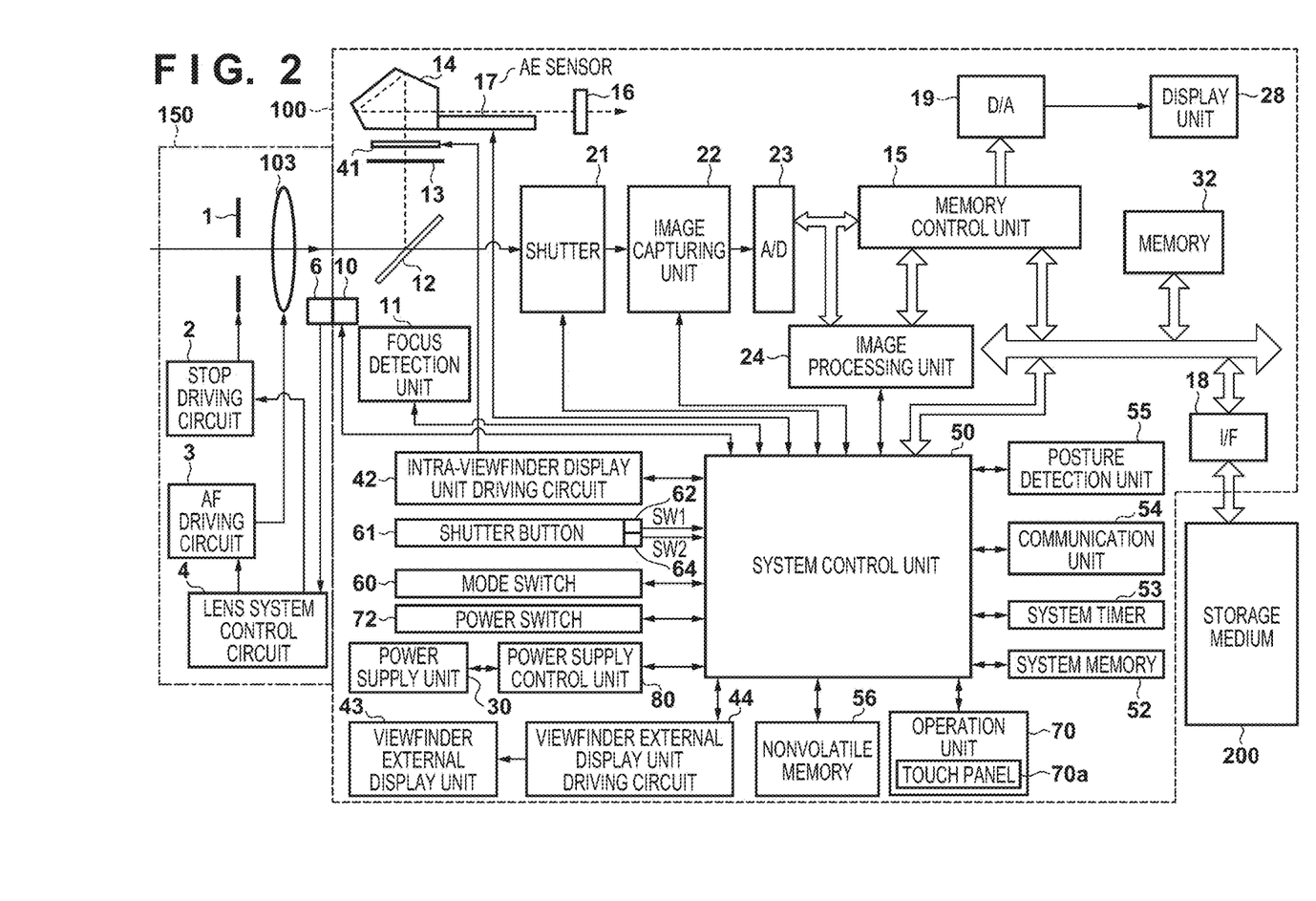
FIG. 2 is a block diagram showing an example of the internal arrangement of the digital camera according to this embodiment.

FIG. 2 is a block diagram showing an example of the arrangement of the digital camera 100 according to this embodiment.

The lens unit 150 is a lens unit on which a photographing lens is mounted, and is replaceably attached to the digital camera 100.

A lens 103 is usually constituted by a plurality of lenses. In this case, however, for the sake of simplicity, FIG. 2 shows only one lens as the lens 103. A communication terminal 6 is a communication terminal via which the lens unit 150 communicates with the digital camera 100 side. The communication terminal 10 is a communication terminal via which the digital camera 100 communicates with the lens unit 150 side. A lens system control circuit 4 in the camera communicates with the system control unit 50 via the communication terminals 6 and 10. The lens system control circuit 4 controls a stop 1 via a stop driving circuit 2, and adjusts focus by displacing the position of the lens 103 via an AF driving circuit 3.

An AE sensor 17 measures the brightness of an object through the lens unit 150. A focus detection unit 11 outputs defocus amount information to the system control unit 50. The system control unit 50 controls the lens unit 150 to perform phase difference AF based on the input defocus amount information.

The quick return mirror 12 (to be referred to as the mirror 12 hereinafter) is moved up and down at the time of exposure, live view shooing, and moving image capturing. The mirror 12 is a mirror for switching an incident light beam from the lens 103 between the eyepiece viewfinder 16 side and the image capturing unit 22 side. The mirror 12 is usually placed to reflect a light beam to guide it to the eyepiece viewfinder 16. At the time of shooting or live view display, the mirror 12 flips up and retreats from the light beam (mirror up) to guide a light beam to the image capturing unit 22. In addition, the central portion of the mirror 12 is a semitransparent mirror to transmit part of light. The mirror 12 transmits part of a light beam to cause it to enter the focus detection unit 11 for focus detection.

A pentaprism 14 guides light from the focusing screen 13 to the eyepiece viewfinder 16 to allow the user to check the focus and composition of an optical image of an object obtained through the lens unit 150 by observing the eyepiece viewfinder 16.

A shutter 21 is a focal-plane shutter which can freely control the exposure time of the image capturing unit 22 under the control of the system control unit 50. The image capturing unit 22 is an image sensor formed from a CCD or CMOS device which converts an optical image into an electrical signal. An A/D converter 23 converts an analog signal into a digital signal. The A/D converter 23 is used to convert the analog signal output from the image capturing unit 22 into a digital signal.

An image processing unit 24 performs resizing processing such as predetermined pixel interpolation or reduction and color conversion processing with respect to data from the A/D converter 23 or data from a memory control unit 15. In addition, the image processing unit 24 performs predetermined arithmetic processing using captured image data. The system control unit 50 then performs exposure control and ranging control based on the obtain arithmetic result. With this operation, the system control unit 50 performs TTL (Through The Lens) AF (AutoFocus) processing, TTL AE (Auto Exposure) processing, and TTL EF (Electronic Flash pre-emission) processing. The image processing unit 24 also performs TTL AWB (Auto White Balance) processing based on the obtained arithmetic result.

Output data from the A/D converter 23 is written in a memory 32 via the image processing unit 24 and the memory control unit 15 or directly written in the memory 32 via the memory control unit 15. The memory 32 stores the image data obtained by converting the data obtained by the image capturing unit 22 into digital data, using the A/D converter 23 and image data to be displayed on the display unit 28. The memory 32 has a storage capacity large enough to store a predetermined number of still images and moving images and sounds with durations of predetermined times. The memory 32 also functions as a memory (video memory) for image display. A D/A converter 19 converts data for image display stored in the memory 32 into an analog signal and supplies it to the display unit 28. The image data for display written in the memory 32 in this manner is displayed by the display unit 28 via the D/A converter 19. The display unit 28 displays an image corresponding to the analog signal from the D/A converter 19 on a display device such as an LCD. The D/A converter 19 converts the digital signals having undergone A/D conversion by the A/D converter 23 once and stored in the memory 32 into analog signals, and sequentially transfers the signals to the display unit 28 to display images, thereby functioning as an electronic viewfinder and performing through image display (live view display).

An intra-viewfinder liquid crystal display unit 41 displays a frame (AF frame) indicating a ranging point at which autofocus is currently performed, icons indicating the setting state of the camera, and the like via an intra-viewfinder display unit driving circuit 42. The viewfinder external display unit 43 displays various set values for the camera, such as a shutter speed and an f-number, via a viewfinder external display unit driving circuit 44.

A nonvolatile memory 56 is a memory capable of electrically erasing and recoding data. For example, an EEPROM or the like is used as the nonvolatile memory 56. The nonvolatile memory 56 stores constants, programs, and the like for the operation of the system control unit 50. The programs in this case are programs for executing various flowcharts to be described later in this embodiment.

The system control unit 50 controls the overall digital camera 100. The system control unit 50 implements various types of processing in this embodiment (described later) by executing the programs recorded on the nonvolatile memory 56 described above. A system memory 52 is, for example, a RAM. Constants, variables, programs read out from the nonvolatile memory 56, and the like for the operation of the system control unit 50 are loaded in the system memory 52. The system control unit 50 also performs display control by controlling the memory 32, the D/A converter 19, the display unit 28, and the like.

A system timer 53 is a time measurement unit for measuring the times used for various types of control and the time of a built-in timepiece. The mode switch 60, a first shutter switch 62, a second shutter switch 64, and the operation unit 70 are operation means for inputting various types of operation instructions to the system control unit 50. The mode switch 60 switches the operation mode of the system control unit 50 to one of the following modes: a still image recording mode, a moving image capturing mode, a playback mode, and the like. The still image recording mode includes the following modes: an auto shooting mode, an auto scene discrimination mode, a manual mode, an aperture-priority mode (Av mode), and a shutter-priority mode (Tv mode). The still image recording mode also includes various types of scene modes with shooting-scene-specific shooting settings, a program AE mode, and a custom mode.

The mode switch 60 directly switches the operation mode to one of these modes. Alternatively, after temporarily switching to a list screen for shooting modes with the mode switch 60, the user may select one of the plurality of displayed modes and switch to the selected mode using another operation member. Likewise, the moving image capturing mode may include a plurality of modes.

The first shutter switch 62 is turned on to generate a first shutter switch signal SW1 when the user operates halfway the shutter button 61 provided on the digital camera 100, that is, performs so-called half-stroke operation (pre-shoot instruction). The camera starts operations such as AF (Auto-Focus) processing, AE (Auto Exposure) processing, AWB (Auto White Balance) processing, and EF (Electronic Flash pre-emission) processing in response to the first shutter switch signal SW1.

The second shutter switch 64 is turned on to generate a second shutter switch signal SW2 when the user completely operates the shutter button 61, that is, performs so-called full-stroke operation (shoot instruction). The system control unit 50 starts a series of shooting processing operations from reading out a signal from the image capturing unit 22 to writing image data in the storage medium 200 in response to the second shutter switch signal SW2.

A power supply control unit 80 is constituted by a battery detection circuit, a DC-DC converter, a switch circuit for switching between blocks to be energized, and the like. The power supply control unit 80 detects the attachment/detachment of a battery, the type of battery, and a battery remaining capacity. In addition, the power supply control unit 80 controls the DC-DC converter and supplies necessary voltages to the respective units including the storage medium 200 for necessary periods based on the detection results and instructions from the system control unit 50. A power supply unit 30 is constituted by a primary battery such as an alkaline battery or lithium battery, a secondary battery such as a NiCd battery, NiMH battery, or Li battery, an AC adapter, and the like. A storage medium I/F 18 is an interface with the storage medium 200 such as a memory card or hard disk. The storage medium 200 is a storage medium such as a memory card for recording captured images, and is formed from a semiconductor memory, magnetic disk, or the like.

A communication unit 54 is connected to an external apparatus wirelessly or via a wired cable, and transmits and receives video signals and audio signals. The communication unit 54 can also be connected to a wireless LAN (Local Area Network) and the Internet. The communication unit 54 can transmit the images (including through images) captured by the image capturing unit 22 and images recorded on the storage medium 200, and can receive image data and other various kinds of information from external apparatuses.

A posture detection unit 55 detects the posture of the digital camera 100 in the direction of gravitational force. It is possible to discriminate, based on the posture detected by the posture detection unit 55, whether the image captured by the image capturing unit 22 is the one captured by the digital camera 100 held in the landscape position or portrait position. The system control unit 50 can add direction information corresponding to the posture detected by the posture detection unit 55 to the image file of the image captured by the image capturing unit 22 or record the image upon rotating it. As the posture detection unit 55, an acceleration sensor, gyro sensor, or the like can be used.

The operation unit 70 includes various types of operation members as input units for accepting operations from the user. As described above, the operation unit 70 includes at least operation members such as the shutter button 61 and the main electronic dial 71, which have been described with reference to FIGS. 1A and 1B.

The operation unit 70 also includes a touch panel 70a which can detect touches on the display unit 28. The touch panel 70a and the display unit 28 can be integrated. For example, the touch panel 70a is configured to prevent the transmittance of light from hindering display on the display unit 28, and is mounted on the upper layer of the display surface of the display unit 28. The input coordinates on the touch panel 70a are then brought into correspondence with the display coordinates on the display unit 28. This can form a GUI (Graphical User Interface) which allows the user to directly operate the screen displayed on the display unit 28. For example, selecting various types of function icons displayed on the display unit 28 allows the user to assign functions to the selected icons, as needed, for each scene in advance and make the selected icons also serve as various types of function buttons. Function buttons include, for example, an end button, a return button, an image feed button, a jump button, a narrow down button, and an attribute change button. For example, when the user presses the menu button, the display unit 28 displays a menu screen which allows the user to make various settings. The user can intuitively make various settings by using the menu screen displayed on the display unit 28 and a four-direction buttons including up, down, right, and left buttons and a SET button.

The system control unit 50 can detect the following operations on the touch panel or its states:
 a new touch on the touch panel 70a with the finger or pen which has not touched the panel, that is, the start of a touch (to be referred to as "Touch-Down" hereinafter);
 a state in which the user is touching the touch panel 70a with his/her finger or pen (to be referred to as "Touch-On" hereinafter);
 the movement of the finger or pen while the user is touching the touch panel 70a with his/her finger or pen (to be referred to as "Touch-Move" hereinafter);
 releasing the finger or pen from the touch panel 70a, that is, the end of touch (to be referred to as "Touch-Up" hereinafter); and
 a state in which nothing is touching the touch panel 70a (to be referred to as "Touch-Off" hereafter).

Upon detecting "Touch-Down", the system control unit 50 simultaneously detects "Touch-On". After "Touch-Down", the system control unit 50 usually keeps detecting "Touch-On" unless detecting "Touch-Up". The system control unit 50 detects "Touch-Move" together with "Touch-On". Even when the system control unit 50 detects "Touch-On", the unit does not detect "Touch-Move" unless the touch position moves. Upon detecting "Touch-Up" of all the fingers or the pen which has touched the touch panel, the system control unit 50 detects "Touch-Off".

Information indicating such an operation or state and the coordinates of the position on the touch panel 70a where the finger or pen touches are notified to the system control unit 50 via an internal bus. The system control unit 50 determines, based on the notified information, a specific operation which has been performed on the touch panel. The system control unit 50 can determine, based on a change in position coordinates, "Touch-Move" including the moving direction of the finger or pen moving on the touch panel, for each vertical component and each horizontal component on the touch panel 70a. Upon detecting "Touch-Up" through a predetermined amount of "Touch-Move" after "Touch-Down" on the touch panel 70a, the system control unit 50 determines that the user has drawn a stroke. The operation of quickly drawing a stroke is called "flick". "Flick" is the operation of quickly moving the finger by a certain distance while touching the touch panel 70a, and then releasing the finger. In other words, this operation is to quickly trace on the touch panel 70a as if flicking with the finger. Upon detecting "Touch-Move" at a predetermined speed or more by a predetermined distance or more and continuously detecting "Touch-Up", the system control unit 50 can determine that the user has performed "flick". Upon detecting "Touch-Move" performed by a predetermined distance or more, the system control unit 50 can determine that the user has performed "drag". As the touch panel 70a, any one of the following types of touch panels may be used: a resistance film type, a capacitive type, a surface acoustic wave type, an infrared type, an electromagnetic induction type, an image recognition type, a photosensor type, and the like. Some types are designed to detect a touch by detecting a contact on the touch panel. Other types are designed to detect a touch by detecting the proximity of the finger or pen to the touch panel. Either of these types can be used.

(Series of Operations Associated with Shooting Standby Screen Processing)

Figure 3:
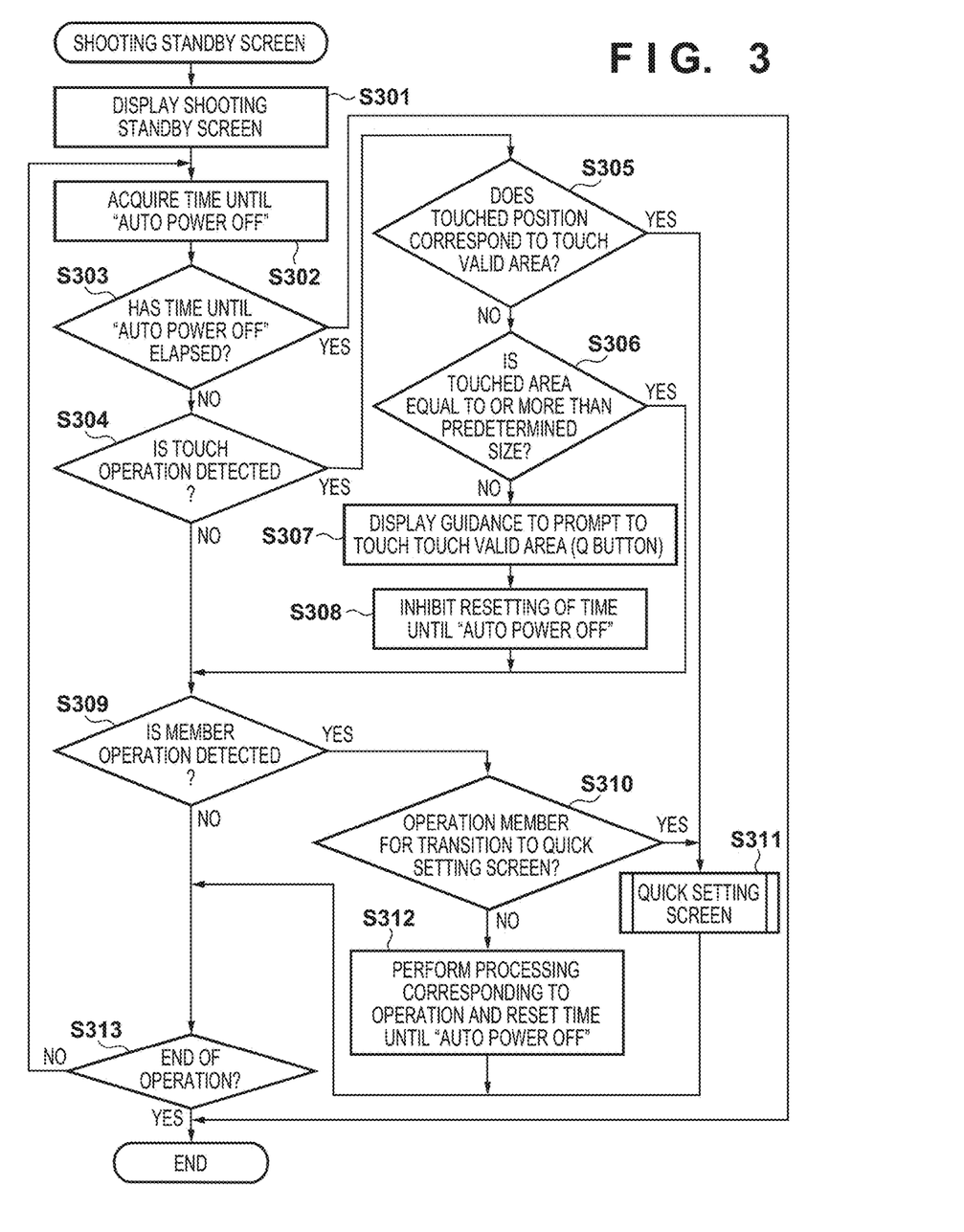
FIG. 3 is a flowchart showing an example of an operation procedure from the start of a shooting standby screen to the end according to this embodiment.
Figure 5A:
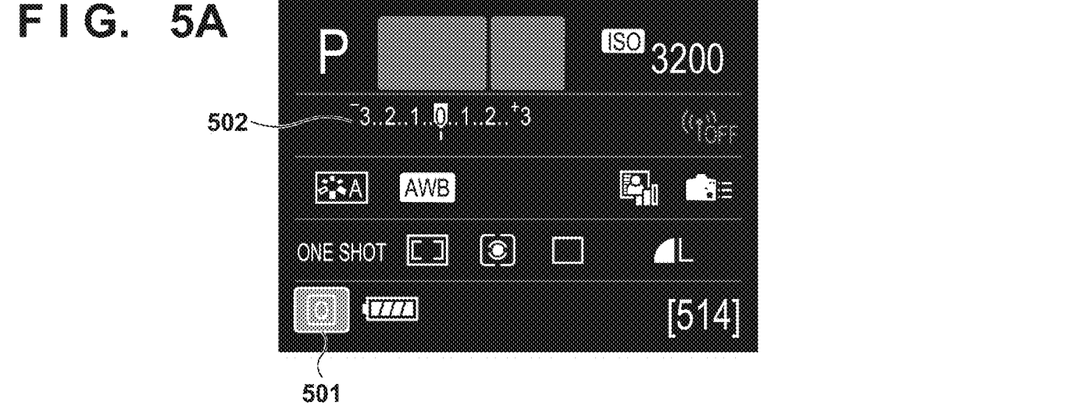
FIG. 5A is a view showing an example of the shooting standby screen according to this embodiment.
Figure 5B:
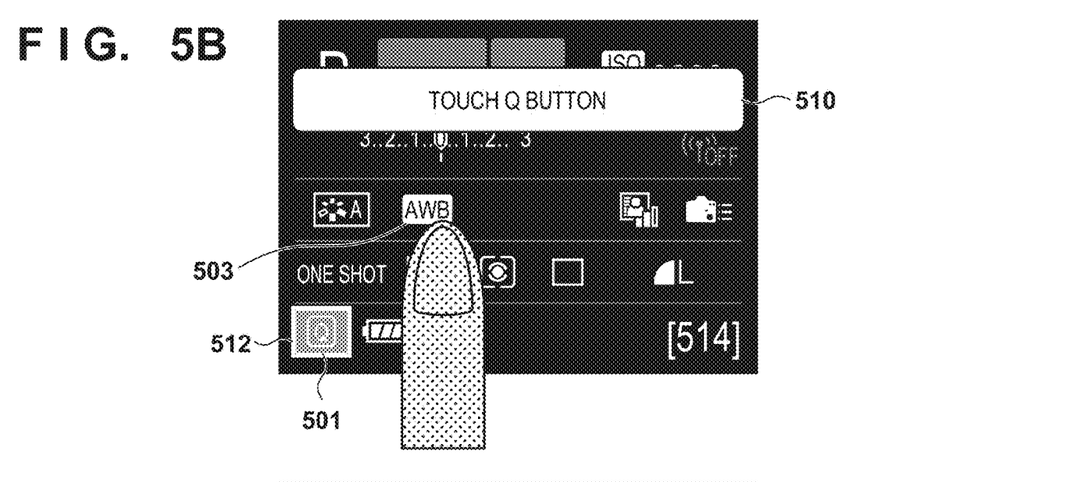
FIG. 5B is a view showing an example of display for the awareness of a touch valid area on the shooting standby screen.

A series of operations associated with shooting standby screen processing according to this embodiment will be described with reference to FIGS. 3, 5A, and 5B. FIG. 3 shows a flowchart for shooting standby screen processing according to the embodiment. FIGS. 5A and 5B each show an example of a shooting standby screen according to the embodiment. The system control unit 50 implements shooting standby screen processing by loading a program recorded on nonvolatile memory 56 into the system memory 52 and executing the program. A shooting standby screen is a screen which is displayed in a shooting standby state and displayed first when the power supply of the digital camera 100 is turned on. This screen is also displayed when a transition occurs from a state other than the shooting standby state, such as the playback mode or menu screen, to the shooting standby state. In the shooting standby state, the user checks an object through the optical viewfinder and displays it (that is, a shooting mode different from the live view shooting model. When SW2 is received while the shooting standby screen is displayed, the above shooting processing is performed based on the setting information displayed on the shooting standby screen. However, a description of this shooting processing will be omitted in the following flowchart.

In step S301, the system control unit 50 displays the shooting standby screen on the display unit 28. FIG. 5A shows an example of the shooting standby screen according to this embodiment. The area of a Q button 501 is a touch valid area configured to cause the system control unit 50 to accept touch operations by the user as valid operations. An area 502 other than the Q button 501 is a touch restriction area configured to cause the system control unit 50 to reject any touch operations by the user as invalid operations. The shooting standby screen displays a list of current setting information (set values) concerning a plurality of setting items for the digital camera 100. Since touch operations on portions other than the Q button 501 are invalid, even if the user touches the set value portion of each displayed setting item (for example, the position of the exposure correction item 502 indicating the set state of exposure correction), the system control unit 50 executes no function. In addition, the system control unit 50 neither stops nor resets the timer for measuring the time of no operation to implement the "auto display off" function in response to touch operations other than a touch operation on the Q button 501. Note that the "auto display off" function reduces the luminance of the display unit 28 depending on whether the time of no operation has continued for a time equal to or longer than the first time. In addition, the system control unit 50 neither stops nor resets the timer for measuring the time of no operation for the auto power off function in response to touch operations other than a touch operation on the Q button 501. In this case, the auto power off function automatically turns off the power supply of the digital camera 100 or sets it in a sleep state depending on whether the time of no operation has continued for a time equal to or more than the second time longer than the first time. The system control unit 50 invalidates touch operations corresponding to positions other than the position of the Q button in this manner. This can prevent a given setting from changing against the user's intention or any unintended function from being executed, when the user unintentionally touches the display unit 28. Likewise, this can prevent unnecessary consumption of power due to the prolongation of time until the execution of "auto display off" and "auto power off". For example., the user may unintentionally touch the display unit 28 when he/she holds the digital camera 100 with his/her hand to lift the digital camera 100. In addition, when the user hangs a strap attached to the digital camera 100 from his/her neck, the display unit 28 comes close to the abdominal region of the user, resulting, in erroneous detection of a touch operation. When the user performs a touch operation on the Q button 501 (for example, the user performs "Touch-Down" on the Q button 501 and then performs "Touch-Up" without moving his/her finger outside the button, while the area of the touch is less than a predetermined area), the system control unit 50 releases the touch restriction state, and makes a transition to the quick setting window. In addition, on the quick setting screen, the system control unit 50 validates touch operations on areas other than the Q button 501.

In step S302, the system control unit 50 acquires the time until "auto power off" stored in the system memory 52.

In step S303, the system control unit 50 determines whether the time until "auto power off" has elapsed. When, for example, the timer for measuring the time of no operation has continued for the second time, the system control unit 50 determines that the time until "auto power off" has elapsed. If the system control unit 50 determines that the time until "auto power off" has not elapsed, the process advances to step S304. In contrast, upon determining that the time until "auto power off" has elapsed, the system control unit 50 turns off the power supply of the digital camera 100 and terminates the shooting standby screen processing. Although not described in detail, processing associated with "auto display off" is almost the same as that described above. That is, the system control unit 50 determines whether the time (first time) until "auto display off" has elapsed. If the time has not elapsed, the process advances to step S304. If the time has elapsed, the system control unit 50 reduces the display luminance of the display unit 28 and the power consumption without turning off the power supply. When the display unit 28 is a liquid crystal display device, the system control unit 50 reduces the luminance of the backlight. When the display unit 28 is a self luminous display such as an organic EL display, the system control unit SO reduces the self-luminous luminance. As described above, since the time until "auto display off" is shorter than the time until "auto power off", the system control unit 50 executes "auto power off" after reducing the luminance by "auto display off".

In step S304, the system control unit 50 determines whether the user has performed a touch operation on the display unit 28. The system control unit 50 determines, for example, whether "Touch-Up" operation with respect to the display unit 28 has been detected after "Touch-Down" without any movement. If the system control unit 50 determines that the user has performed a touch operation, the process advances to step S305. If the system control unit 50 cannot determine that the user has performed a touch operation, the process advances to step S309.

In step S305, the system control unit 50 determines whether the detected touch position falls within a touch valid area (that is, within the display area of the Q button 501). If the system control unit 50 determines that the user has performed a touch operation outside the display area of the Q button 501 (that is, an area configured to invalidate touches), the process advances to step S306. In contrast, if the system control unit 50 determines that the user has performed a touch operation within the display area of the Q button 501 (for example, the user has performed "Touch-Down" within the display area of the Q button 501 and then has performed "Touch-Up" without any movement out of the display area of the Q button 501), the process advances to step S311.

In step S306, the system control unit 50 determines whether the detected touch area is equal to or larger than a predetermined size. If the system control unit 50 determines that the area of the detected touch operation is equal to or larger than the predetermined size, the process advances to step S309 without accepting any touch operation. This is because it is highly likely at the detected touch operation is neither a finger touch nor a touch operation intended by the user. For example, such a touch operation results when the user looks in the viewfinder and his/her entire face touches the display unit or when the user hangs a strap attached to the digital camera from his/her neck and his/her abdominal region widely touches the display unit. In contrast, if the system control unit 50 determines that the area of the detected touch operation is not equal to or larger than the predetermined size, the process advances to step S307 upon accepting the touch operation.

In step S307, the system control unit 50 displays guidance on the display unit 28 to guide the user to touch within the display area of the Q button 501. FIG. 5B shows an example of displaying guidance according to this embodiment. The system control unit 50 detects, on the shooting standby screen, a touch ("Touch-Down") on the position other than the display area of the Q button 501, at is the position of a setting item 503 concerning white balance in the illustrated example, and hence displays the message "touch Q button" in guidance 510. The guidance 510 may be formed from a combination of information (a character or icon indicating the Q button) specifying an area configured to accept touch operations and operation information (for example, a character or icon indicating a touch) concerning the area. In addition, the system control unit 50 displays a highlighted frame 512 around the Q button 501 as a guide indicating the position of the Q button 501. The system control unit 50 automatically hides the guidance 510 and the highlighted frame 512 when the user releases a touch ("Touch-Up") which is a factor that has caused them to be displayed or when several seconds have elapsed after the start of display or "Touch-Up". Note that the system control unit 50 may display one of the guidance 510 and the highlighted frame 512 instead of displaying both of them. In addition, a guide indicating the position of the Q button 501 may include expressions other than displaying the highlighted frame 512, for example, changing the display color of the Q button 501, blinking display of the Q button 501, and animation display of the Q button 501 such as repeatedly enlarging and reducing the display or vibrating the display horizontally or vertically. Furthermore, in addition to changing the display of the Q button 501, it is possible to change the luminance or color of a portion other than the Q button 501 (for example, assigning a dark color to a restriction area) or add an indication (for example, a graphic pattern such as an arrow) that attracts attention to the Q button 501 to a peripheral portion of the area of the Q button 501.

In step S308, the system control unit 50 does not reset the time until "auto power off" and the time until "auto display off" even if a touch operation is performed. This is because a touch as a factor that causes the guidance 510 and the highlighted frame 512 to be displayed may be an operation that the user has unintentionally performed. Since the system control unit 50 does not reset the times until "auto power off" and "auto display off" as described above, it is possible to reduce unnecessary power consumption. Note that in order to enable the user to touch the Q button 501 and implement the function after he/she reliably understand the contents of the guidance 510 and the highlighted frame 512, it is preferable to refrain from performing auto power off" or "auto display off" until the end of the display of the dance 510 and the highlighted frame 512 even if the current time has reached the no operation time until "auto power off" or "auto display off" during the display of the guidance 510 and the highlighted frame 512. Assume that setting has been made to perform "auto power off" when the no operation time has reached 1 min. Assume also that the user has touched a position other than the Q button 501 when the no operation time immediately after the execution of operation A has reached 59 sec, and that the guidance 510 and the highlighted frame 512 are to be displayed for 5 sec after the start of the display of the guidance 510 and the highlighted frame 512. In this case, if the user does not still perform any valid operation including touching the Q button 501, the guidance 510 and the highlighted frame 512 are hidden after the elapse of 64 sec from operation A, and at the same time, "auto power off" is executed to turn off the power supply. On the other hand, even if 60 sec has elapsed from operation A, touching the Q button 501 within 5 sec from the start of the display of the guidance 510 and the highlighted frame 512 allows the operation to be accepted to make a transition to the quick setting screen in accordance with the touch on the Q button 501. In addition, even if the user erroneously touches the display unit because of an erroneous operation, since the extended periods to "auto power off" and "auto display off" are minimized, it is possible to reduce unnecessary power consumption.

In step S309, the system control unit 50 determines whether the user has performed an operation on any member included in the operation unit 70 other than the touch panel 70*a* (member operation). If the system control unit 50 determines that the user has performed a member operation, the process advances to step S310; otherwise, the process advances to step S313.

In step S310, the system control unit 50 determines whether the member operation determined in step S309 is an operation for making a transition to the quick setting screen. More specifically, the system control unit 50 determines whether the user has pressed the quick setting button included in the operation unit 70. If the system control unit 50 determines that the user has performed an operation for making a transition to the quick setting screen (has pressed the quick setting button), the process advances to step S311; otherwise, the process advances to step S312.

In step 3311, the system control unit 50 displays the quick setting screen and performs quick setting screen processing. Note that the details of the quick setting screen will separately described with reference to FIG. 4.

In step 3312, the system control unit 50 performs processing corresponding to the operation determined in step S310. For example, when the user has operated the main electronic dial 71 included in the operation unit 70, the system control unit 50 changes the set shutter speed if the shutter-priority shooting mode is set, and changes the set f-number if the aperture-priority shooting mode is set. When the user has pressed the playback button 79, the system control unit 50 makes a shift to the playback mode. When making a shift to the layback mode, the system control unit 50 terminates the shooting standby screen processing, and makes a shift to playback mode processing upon playing back an image. In addition, in step S312, the system control unit 50 resets and restarts the timer for measuring the time until "auto power off" and the time until "auto display off". This extends the time until "auto power off" and the time until "auto display off" to the no operation times based on the operations accepted in step S310.

In step S313, the system control unit 50 determines whether the user has performed the operation of terminating the shooting standby screen processing. For example, the system control unit 50 determines whether the user has performed the operation of turning off the power supply. Upon determining that the user has performed a terminating operation, the system control unit 50 terminates the series of operations associated with the shooting stand screen processing; otherwise, the process returns to step S302.

(Series of Operations Associated with Quick Setting Screen Processing)

An operation procedure for quick setting screen processing in step S311 will be described below with reference to FIG. 4. The system control unit 50 implements this processing by loading a program stored in the nonvolatile memory 56 into the system memory 52 and executing the program.

Figure 4:
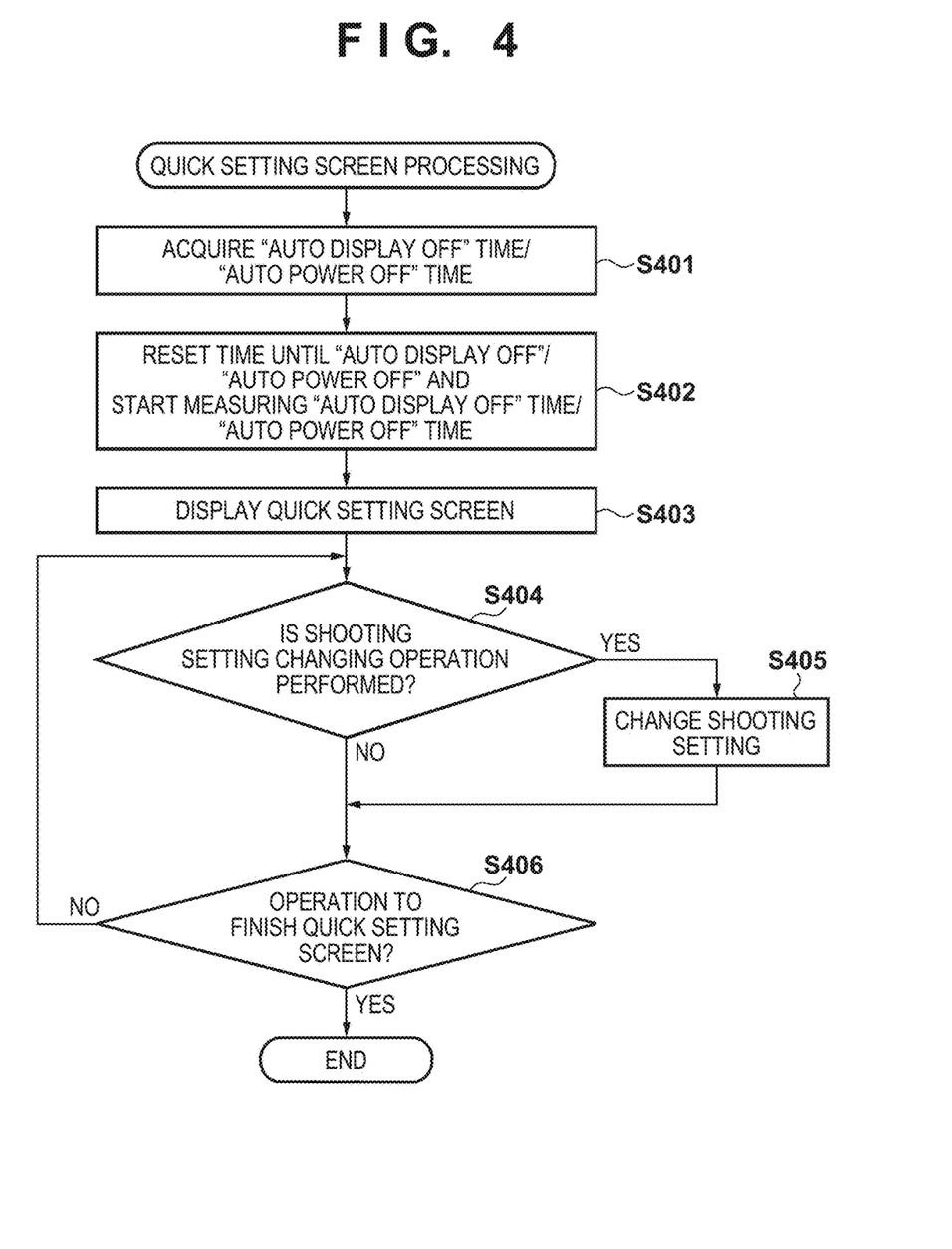
FIG. 4 is a flowchart showing an example of an operation procedure from the start of a quick setting screen to the end according to this embodiment.

FIG. 4 is a flowchart showing an example of a process from displaying the quick setting screen to completing shooting setting.

In step S401, the system control unit 50 acquires the auto display off time and the auto power off time stored in the system memory 52. In step S402, the system control unit 50 resets the timer which has measured the time until "auto display off"/"auto power off", and restarts the timer to measure the "auto display off" time/"auto power off" time. This extends the time until "auto display off"/"auto power off".

Figure 5C:
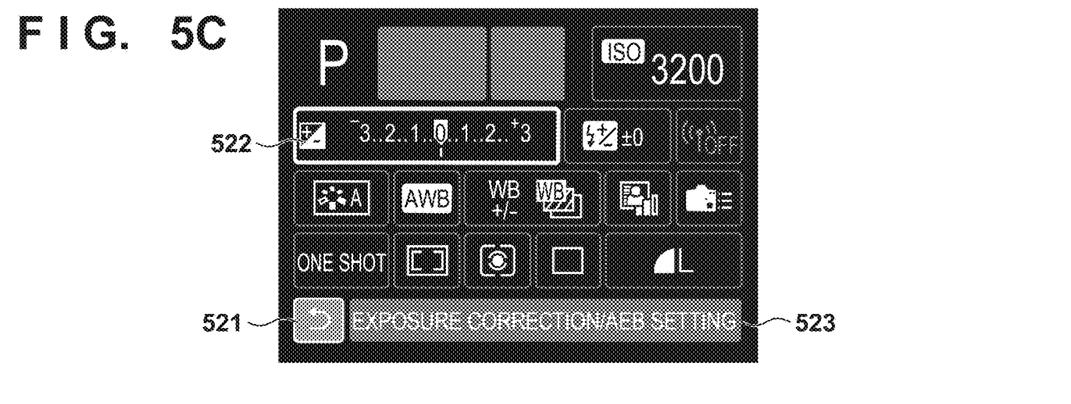
FIG. 5C is a view showing an example of the quick setting screen.

In step S403, the system control unit 50 displays the quick setting screen on the display unit 28. FIG. 5C shows an example of the quick setting screen according to this embodiment. The quick setting screen has almost the same screen configuration as that of the shooting standby screen described above, and displays various setting items in the same layout as that of the shooting standby screen. Note however that the restrictions imposed on touch operations restricted on the shooting standby screen are released to validate touch operations on the en ire surface of the display unit 28. That is, the system control unit 50 activates the various setting items indicating setting information in the form of touch icons to allow them to accept touch operations. Unlike the shooting standby screen, the quick setting screen has a display form that allows the user to recognize each setting item as touch button by displaying a boundary line indicating the touch acceptance range of the setting, item to show that a touch operation on each setting item can be accepted. For example, this screen displays a boundary line surrounding an exposure correction setting, item 522. The user can make a transition to an exposure correction setting screen and change exposure correction value settings by touching the inside of this boundary line. In addition, the display of the quick setting screen differs from that of the shooting standby screen in that it displays a return button 521 for returning to the shooting standby screen, in place of the Q button 501, at the position where the Q button 501 is displayed on the shooting standby screen. In addition, the user can select any one of the various setting items displayed on the quick setting screen by operating the cross-key 74 included in the operation unit 70. The system control unit 50 displays a selection frame on the item selected by the user, and displays the contents of the selected item at the position of a guide 523. When the user operates the main electronic dial 71, the system control unit 50 changes the set value of the selected item. For example, when the user operates the main electronic dial 71 in the state shown in FIG. 5C, the system control unit 50 changes the exposure correction value.

In step S404, the system control unit 50 determines, based on an operation instruction from the operation unit 70 or the like, whether the user has performed a shooting setting changing operation. A shooting setting changing operation includes operating the main electronic dial 71 or a touch operation on one of the various setting items displayed on the quick setting screen. If the system control unit 50 determines, based on an input from the operation unit 70, that the user has performed a shooting setting changing operation, the process advances to step S405. In contrast, if the system control unit 50 determines that the user has not performed any shooting setting changing operation, the process advances to step S406.

In step S405, the system control unit 50 changes the shooting setting in accordance with the looting setting changing operation. The system control unit 50 resets the timer which has measured the time until "auto display off"/"auto power off", and restarts the timer to measure the "auto display off" time/"auto power off" time. This extends the time until "auto display off"/"auto power off".

In step S406, the system control unit 50 determines, based on an operation instruction from the operation unit 70 or the like, whether the user has performed an operation to finish the display of the quick setting screen. An operation to finish the display of the quick setting screen includes, for example, a touch operation on the return button 521. If the user has performed an operation to finish the display of the quick setting screen, the system control unit 50 resets the timer which has measured the time until "auto display off"/"auto power off", and restarts the timer to measure the "auto display off" time/"auto power off" time. In addition, the system control unit 50 finishes the display of the quick setting screen, and the process returns to step S301 to display the shooting standby screen in FIG. 3. In contrast, if the user has not performed any operation to finish the display, the process advances to step S404.

According to this embodiment, when the user performs a touch operation on an area configured to accept touch operations on a screen configured to accept touch operations only on specific areas such as the Q button instead of on the entire screen, the system control unit 50 performs display for showing an area configured to accept touch operations. This enables the user to recognize that his/her touch operation has not been accepted (the intended operation has not been performed), and to also recognize how he/she can make his/her touch operation be accepted. Displaying a position where the user should perform a touch operation to release restrictions from touch operations, in particular, can prevent the user from being disabled to perform a touch operation because of not knowing how to release restrictions from touch operations. That is, the user can release restrictions from touch operations without any hesitation and set a state in which he/she can perform operations by touch.

Note that the above various types of control described as being performed by the system control unit 50 may be performed by one piece of hardware. Alternatively, a plurality of pieces of hardware may control the overall apparatus by serving their roles in processing.

Although the present invention has been described in detail based on the preferred embodiments, the invention is not limited to these specific embodiments and includes various forms without departing from the spirit and scope of the invention. In addition, each embodiment described above is merely an embodiment of the present invention, and the respective embodiments can be properly combined.

Although the above embodiments have been described by exemplifying the case in which the present invention is applied to the digital camera 100, the present invention is not limited to this. The present invention can be applied to any electronic apparatuses including operation means which can be operated by touch. That is, the present invention can be applied to personal computers, PDAs, cellular phone terminals, portable image viewers, printer apparatuses including displays, digital photo frames, music players, game machines, electronic book readers, tablet terminals, smartphones, wearable terminals including watch terminals, projectors having displays, home electrical appliances having displays, in-vehicle apparatuses, Shopping machines such as vending, machines, medical apparatuses (testing apparatuses and diagnostic apparatuses) having displays, and the like.

Figure 6A:
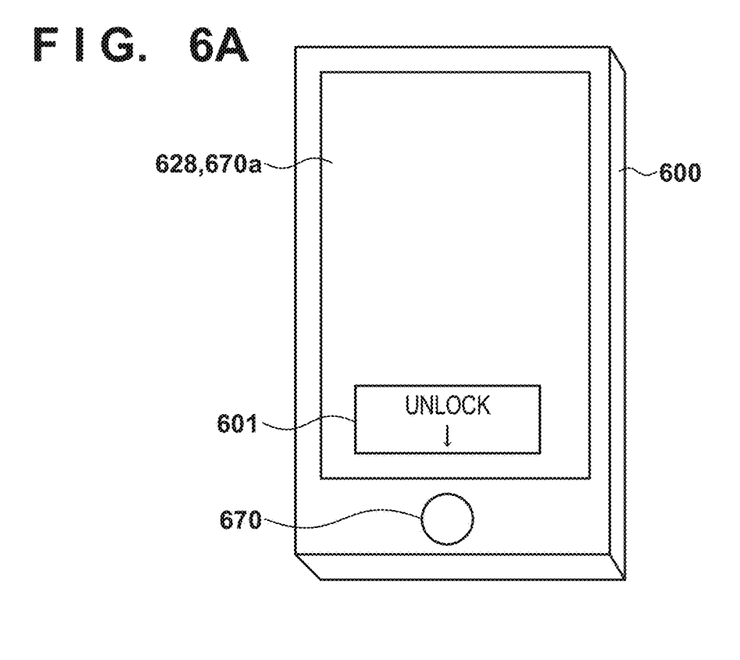
FIGS. 6A and 6B are perspective views showing an example of releasing a lock state on a smartphone or the like according to this embodiment.
Figure 6B:
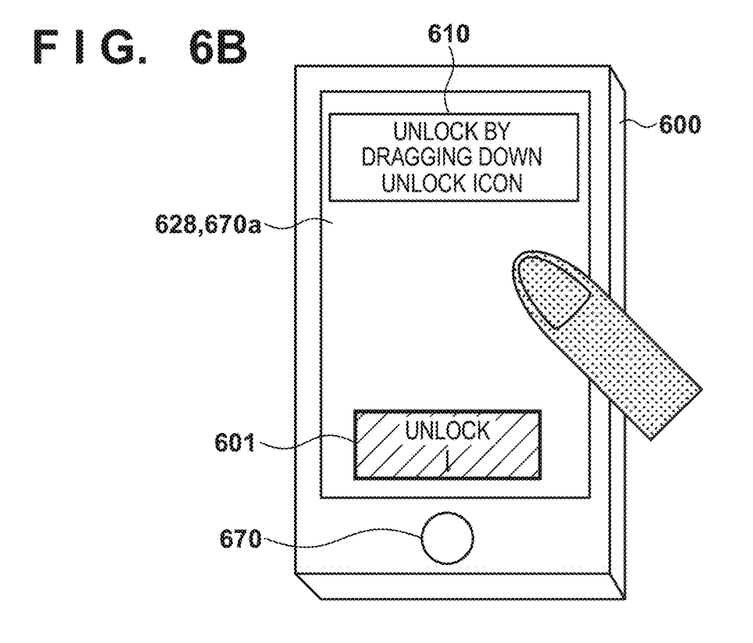

For example, the present invention can be applied to an electronic apparatus such as a smartphone to release a lock state which is set to restrict touch operations when the user has performed no operation over a predetermined time or more. This application will be described below with reference to FIGS. 6A and 6B. Assume that a smartphone 600 has a display unit 628 integrated with a touch panel 670a. When the user has performed no operation over a predetermined time or more, the display unit 628 is set in a hidden state by "auto display off" or "auto power off". When the user operates an operation unit 670 in this state, the display unit 628 displays an unlock screen, as shown in FIG. 6A. That is, the display unit 628 displays the unlock screen when returning from the power saving state. For example, the user performs "Touch-Down" on an unlock button 601 displayed on the unlock screen and then continuously performs "Touch-Move" downward to unlock, thus validating touches on the entire surface of the touch panel 670a. Assume also that when touches on the entire surface of the touch panel 670a are validated, a transition is made to a display state such as the home screen. If the user does not know that he/she cannot unlock on this unlock screen unless he/she operates the unlock button 601, he/she may touch a position different from the unlock button 601. According to the present invention, when the user touches a position other than the unlock button 601, guidance 610 is displayed to prompt the user to operate the unlock button 601, as shown in FIG. 6B. In the case shown in FIG. 6B, the message "unlock by dragging down unlock icon" is displayed on the guidance 610. In addition, the unlock button 601 is highlighted. Various techniques can be used for highlighting as described concerning the Q button 501. In this case, time measurement and the like for "auto display off" and "auto power off" are performed in the same manner as in the above case described by using the digital camera 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110218, filed Jun. 1, 2016, which is hereby incorporated by reference herein in its entirety.

What is claimed is:

1. An image capturing apparatus comprising:
an image capturing unit;
a display configured to accept a touch operation, wherein the display displays a screen that indicates a set value of each setting item concerning shooting as a shooting standby screen;
a detector configured to detect a touch operation on the display;
a system controller configured to control the image capturing apparatus to be in a touch operation restriction state in which a touch operation on a position different from a specific area on the display is invalidated upon displaying the shooting standby screen in the display, and control the image capturing apparatus, in the restriction state, to release the restriction state and make a transition to a state in which a touch operation on a position different from the specific area is accepted upon detecting a touch operation on the specific area and to make the set value of each setting item concerning shooting changeable by the touch operation; and
a display controller configured to control the display to perform display to indicate the specific area upon detecting a touch operation on a position different from the specific area on the display in the restriction state.

2. The apparatus according to claim 1, wherein even when a touch operation on a position different from the specific area is detected in the restriction state, the system controller performs control so as not to execute predetermined processing assigned to the position in advance.

3. The apparatus according to claim 1, wherein even when a touch operation on a position different from the specific area is detected in the restriction state, the system controller performs control so as not to execute processing other than display to indicate the specific area.

4. The apparatus according to claim 1, further comprising a timer configured to measure a time during which no touch operation on the display is detected to make a transition to a state in which power consumption is reduced,
wherein the system controller performs control to reset and restart the timer upon detecting a touch operation on the display, and
wherein the system controller performs, in the restriction state, control so as not to reset the timer upon detecting a touch operation on a position different from the specific area.

5. The apparatus according to claim 4, wherein the system controller performs control to make a transition to the state in which power consumption is reduced when the time during which no touch operation is detected has reached a predetermined time while performing no display to indicate the specific area, and performs control so as not to make a transition to the state in which power consumption is reduced even when the time during which no touch operation is detected has reached the predetermined time while performing display to indicate the specific area.

6. The apparatus according to claim 5, wherein the system controller performs control to reset the timer upon detecting a touch operation on the specific area while performing display to indicate the specific area.

7. The apparatus according to claim 1, wherein the display to indicate the specific area includes information specifying the specific area and operation contents corresponding to the specific area.

8. The apparatus according to claim 1, wherein the display to indicate the specific area includes display of a message prompting to perform a touch operation on the specific area.

9. The apparatus according to claim 1, wherein the display to indicate the specific area includes highlighting display for highlighting the specific area.

10. The apparatus according to claim 9, wherein the highlighting display includes at least one of display of a highlighted frame for highlighting a frame of the specific area, changing a display color or a luminance of at least a portion of the specific area, adding an animation to the portion, and blinking display of the portion.

11. The apparatus according to claim 9, wherein the highlighting display includes at least one of changing a display color or a luminance of at least a portion of an area other than the specific area and an indication made in an area other than the specific area to attract attention to the specific area.

12. The apparatus according to claim 1, wherein the display controller displays a specific function button in the specific area in the restriction state.

13. The apparatus according to claim 1, wherein the display controller displays a set value of a setting item of the image capturing apparatus in the restriction state.

14. The apparatus according to claim 1, wherein the display controller displays each of setting items of the image capturing apparatus together with a boundary line indicating an area configured to accept a touch operation, when a transition is made to a state in which a touch operation on a position different from the specific area is accepted.

15. The apparatus according to claim 1, wherein the display controller displays a plurality of function buttons configured to allow touch operations, when a transition is made to a state in which a touch operation on a position different from the specific area is accepted.

16. The apparatus according to claim 1, wherein the system controller performs control to make a transition to the restriction state upon shifting to a shooting mode.

17. The apparatus according to claim 1, wherein the system controller performs control to make a transition to the restriction state when a power supply of the image capturing apparatus is turned on.

18. The apparatus according to claim 1, wherein the display controller controls the display so as to be capable of changing, by a touch operation, each setting item concerning shooting displayed in the shooting standby screen upon detecting a touch operation on the specific area and releasing the restriction state.

19. The apparatus according to claim 18, wherein the display controller controls so as to display each setting item concerning shooting in the same layout in states of before and after releasing the restriction state.

20. A control method of an image capturing apparatus that comprises an image capturing unit and a display configured to accept a touch operation, the method comprising:
- displaying on the display a screen that indicates a set value of each setting item concerning shooting as a shooting standby screen;
- detecting a touch operation on the display;
- controlling the image capturing apparatus to be in a touch operation restriction state in which a touch operation on a position different from a specific area on the display is invalidated upon displaying the shooting standby screen in the display, and controlling the image capturing apparatus, in the restriction state, to release the restriction state and make a transition to a state in which a touch operation on a position different from the specific area is accepted upon detecting a touch operation on the specific area and to make the set value of each setting item concerning shooting changeable by the touch operation; and
- controlling the display to perform display to indicate the specific area upon detecting a touch operation on a position different from the specific area on the display in the restriction state.

* * * * *